US012768338B2

(12) United States Patent
Chang et al.

(10) Patent No.: US 12,768,338 B2
(45) Date of Patent: Oct. 20, 2026

(54) PULSED-PLASMA THRUSTER USING UNBALANCED THETA-PINCH

(71) Applicant: National Cheng Kung University, Tainan City (TW)

(72) Inventors: Po-Yu Chang, Tainan City (TW); Te-Yueh Chen, Tainan City (TW)

(73) Assignee: National Cheng Kung University, Tainan City (TW)

( * ) Notice: Subject to any disclaimer, the term of this patent is extended or adjusted under 35 U.S.C. 154(b) by 526 days.

(21) Appl. No.: 18/404,653

(22) Filed: Jan. 4, 2024

(65) Prior Publication Data

US 2025/0101965 A1 Mar. 27, 2025

(30) Foreign Application Priority Data

Sep. 22, 2023 (TW) ................................ 112136387

(51) Int. Cl.
*F03H 1/00* (2006.01)

(52) U.S. Cl.
CPC ......... *F03H 1/0018* (2013.01); *F03H 1/0012* (2013.01); *F03H 1/0087* (2013.01)

(58) Field of Classification Search
CPC ..... F03H 1/0087; F03H 1/0012; F03H 1/0018
See application file for complete search history.

(56) References Cited

U.S. PATENT DOCUMENTS

| | | | | |
|---|---|---|---|---|
| 9,242,747 | B1 * | 1/2016 | Burton | B64G 1/413 |
| 2016/0207642 | A1 * | 7/2016 | Longmier | B64G 1/413 |

* cited by examiner

*Primary Examiner* — Rodolphe Andre Chabreyrie
(74) *Attorney, Agent, or Firm* — RABIN & BERDO, P.C.

(57) ABSTRACT

A pulsed-plasma thruster using an unbalanced theta-pinch includes a gas-puff generator, an ionization convergent-divergent nozzle, and an accelerating coil set. The gas-puff generator supplies a gas puff in a pulsed manner; and the accelerating coil set is arranged on a side of a throat of the ionization convergent-divergent nozzle. After the gas puff enters the ionization convergent-divergent nozzle, an electric arc is generated between the pair of electrodes of the ionization convergent-divergent nozzle so that the gas puff is ionized and forms a plasma plume, and the electrodes are utilized to drive the accelerating coil set to generate axially non-uniform magnetic fields, to accelerate the plasma plume. Based on this, the control of thrust force generation is simple and reliable, with high energy utilization efficiency.

10 Claims, 4 Drawing Sheets

PULSED-PLASMA THRUSTER USING UNBALANCED THETA-PINCH

CROSS-REFERENCE TO RELATED APPLICATION

This non-provisional application claims priority under 35 U.S.C. § 119(a) to patent application No. 112136387 filed in Taiwan, R.O.C. on Sep. 22, 2023, the entire contents of which are hereby incorporated by reference.

BACKGROUND

Technical Field

The present invention relates to a pulsed-plasma thruster using an unbalanced theta-pinch, and in particular, to a propulsion device applicable to outer space.

Related Art

In recent years, with the advancement of space sciences and technologies, electric propulsion devices have been increasingly used in various types of space missions. Compared with chemical propulsions, electric thrusters offer a higher energy efficiency. Although thrusts of the electric thrusters are far below that of the chemical propulsions, the output of the electric thrusters can last longer in space, and the same mass of propellant can provide a higher final velocity. Therefore, in a space mission with a longer distance, an electric propulsion is more suitable than a chemical propulsion.

Common existing electric propulsion devices include: a pulsed-plasma thruster (PPT), a magnetoplasmadynamic thruster (MPDT), a magnetic-nozzle-plasma thruster (MNPT), and an arc-jet thruster. The PPT generates a pulse current through capacitor discharge, vaporizes a solid propellant and then ionizes it to form a plasma. The plasma is then accelerated by the Lorentz force to produce thrust. However, the use of the solid propellant in PPT requires vaporization and ionization, which results in lower energy efficiency. Additionally, a triggering circuit is needed to initiate the pulsed electric current, making the system relatively complex.

In addition, the MPDT operates by pre-ionizing gas to form plasma. Thrust is generated by accelerating the plasma through the Lorentz force from the steady-state electric currents within the plasma and the magnetic field it generates. All current MPDTs operate in a high-power regime and are not suitable to small satellites. In addition, the plasma ionization rate is also relatively low, leading to a less efficient propulsion. In addition, Magnetic-Nozzle-Plasma Thrusters (MNPT) operate similarly by pre-ionizing gas to create plasma and then using coils to generate a magnetic field to accelerate the plasma via the Lorentz force. However, they share a similar issue with MPDT where their plasma ionization rate is relatively low, resulting in a lower propulsion efficiency.

In another aspect, the arc-jet thruster ionizes the gas through electric arc discharge to form the plasma and heats the plasma, and then accelerates the plasma through an ionization convergent-divergent nozzle to generate the thrust. However, since the gas is ionized through high-current electric arc discharge to form the plasma and subsequently heated, the electrodes have a relatively short lifespan. Furthermore, conventional arc puff thrusters typically operate in a high-power regime, making them less suitable for use on small satellites.

SUMMARY

In view of this, embodiments of the present invention provide a pulsed-plasma thruster using an unbalanced theta-pinch. This thruster offers an effective solution to the problems associated with prior art. It provides a straightforward and reliable control mechanism for overall thrust generation and offers excellent energy efficiency.

A pulsed-plasma thruster using an unbalanced theta-pinch in an embodiment of the present invention includes a gas-puff generator, an ionization convergent-divergent nozzle (ICDN), and an accelerating coil set. The gas-puff generator includes a gas outlet; and the ionization convergent-divergent nozzle includes a pair of electrodes, an insulating nozzle, and a capacitor, where the insulating nozzle is sandwiched between the pair of electrodes and includes a convergent hole, a throat, and a divergent hole. The convergent hole and the divergent hole are separately located on two opposing surfaces of the insulating nozzle and are connected with each other through the throat. The convergent hole is attached to the gas outlet of the gas-puff generator; and the capacitor is connected in parallel to the pair of electrodes and supplies a voltage across the pair of electrodes. The accelerating coil set is arranged on a side of the throat, and the accelerating coil set is electrically connected to the pair of electrodes. In response to supplying a gas puff to the ionization convergent-divergent nozzle by the gas-puff generator, an electric arc is generated between the electrode pair of the ionization convergent-divergent nozzle so that the gas puff is ionized and forms a plasma plume, and conducts the accelerating coil set to generate a magnetic field to accelerate the plasma plume.

A pulsed-plasma thruster using an unbalanced theta-pinch in another embodiment of the present invention includes a gas-puff generator, an ionization convergent-divergent nozzle, and a pair of accelerating coil sets. The gas-puff generator includes a gas outlet and is configured to supply a gas puff in a pulsed manner through the gas outlet. The ionization convergent-divergent nozzle includes a pair of electrodes, an insulating nozzle, a capacitor, where the insulating nozzle is sandwiched between the pair of electrodes and includes a convergent hole, a throat, and a divergent hole. The convergent hole and the divergent hole are separately located on two opposing surfaces of the insulating nozzle and are connected with each other through the throat. The convergent hole is attached to the gas outlet of the gas-puff generator. The capacitor is connected across the pair of electrodes and supplies a voltage across the pair of electrodes. The pair of accelerating coil sets are arranged on a side of the throat of the ionization convergent-divergent nozzle, and are electrically connected to the pair of electrodes. When the gas puff enters the ionization convergent-divergent nozzle, an electric arc is generated between the pair of electrodes of the ionization convergent-divergent nozzle so that the gas puff is ionized and forms a plasma plume, and the pair of electrodes further conducts the pair of accelerating coil sets, that is, the current through the electrode pair simultaneously drives the accelerating coil sets and generates axially non-uniform magnetic fields to accelerate the plasma plume. The magnetic field generated by one of the accelerating coil sets that is located on the upstream side of the gas puff or the plasma plume is greater than that generated by the one that is located on a downstream side of the gas puff or the plasma plume. Further, the magnetic field at the throat is greater than that on the downstream side of the throat.

In conclusion, according to the pulsed-plasma thruster using an unbalanced theta-pinch in some embodiments, since a gaseous propellant is used, eliminating the need for energy consumption in vaporizing solid propellants and reducing overall energy consumption. When the gas puff passes through the ionization convergent-divergent nozzle, it forms a self-triggered high-voltage breakdown eliminating the need for an additional triggering circuit. By ionizing the gas through an arc discharge, it achieves a higher ionization rate and has lower electrode wear, resulting in an extended lifespan.

Additionally, in terms of thrust, in some embodiments, the device integrates the cold-gas thrust generated by the gas puff passing through the ionization convergent-divergent nozzle, the electrothermal thrust produced by heating the plasma through the electric arc, and the electromagnetic thrust generated by the electromagnetic force. This results in a high overall thrust and propulsion efficiency. Furthermore, these three types of thrust can be used individually or in combination, offering flexibility in adjusting the thrust as needed in various embodiments.

DETAILED DESCRIPTION

Figure 1:
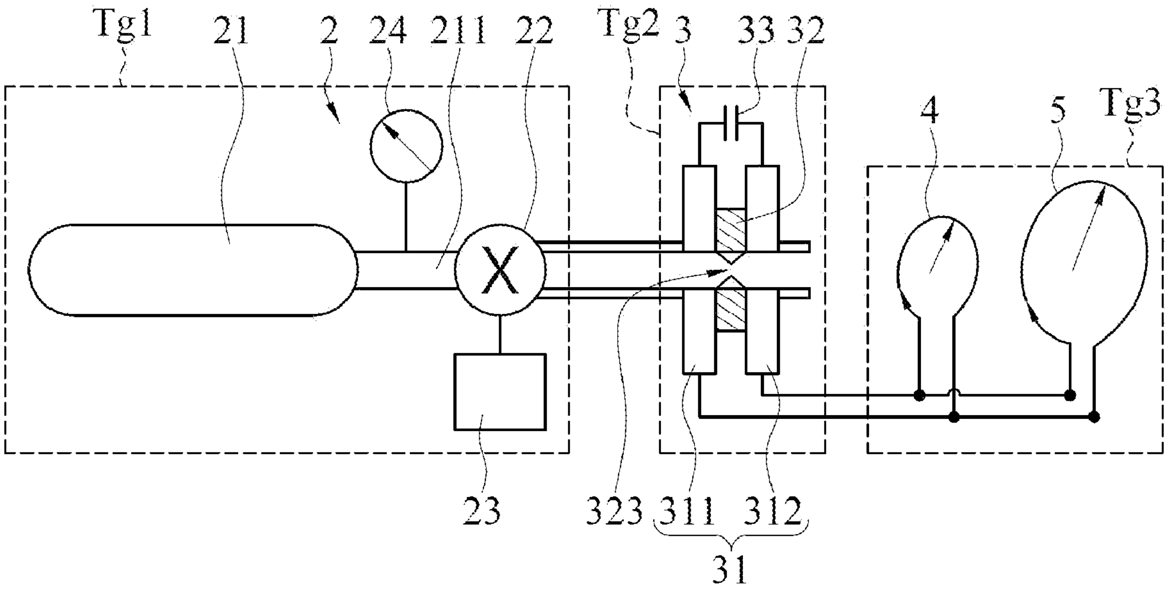
FIG. 1 is a schematic diagram according to an embodiment of the present invention.

Various embodiments are described in detail below. However, the embodiments are merely used as examples for description and do not limit the scope of the present invention. In addition, some elements are omitted in the drawings in the embodiments to clearly illustrate the technical features of the present invention. In addition, the same reference numerals are used to represent the same or similar elements in all the drawings, and the drawings of the present invention are for schematic illustration only, which may not be drawn to scale, and not all details are necessarily presented in the drawings.

First refer to FIG. 1, which is a schematic diagram according to an embodiment of the present invention. As shown in the figure, in some embodiments, an entire thruster mainly includes a gas-puff generator 2, an ionization convergent-divergent nozzle 3, and accelerating coil sets 4 and 5. The gas-puff generator 2 is commonly referred to as a cold-gas thruster and mainly includes a high-pressure-gas reservoir 21, a pulse valve 22, a pulse-valve controller 23, and a pressure gage 24.

The high-pressure-gas reservoir 21 in the gas-puff generator 2 can provide a positive pressure (typically high pressure) gas propellant, such as a high-pressure-gas cylinder. The gas may include, but is not limited to, argon, and other gases that is capable of forming a plasma, such as xenon, neon, or hydrogen, may also be suitable. In addition, the pulse valve 22 is arranged at a gas outlet 211 of the high-pressure-gas reservoir 21. It may be an electromagnetic pulse valve, which can be intermittently opened or closed under the control of the pulse-valve controller 23, thereby supplying a gas puff of the gas propellant in a pulsed manner.

Figure 2A:
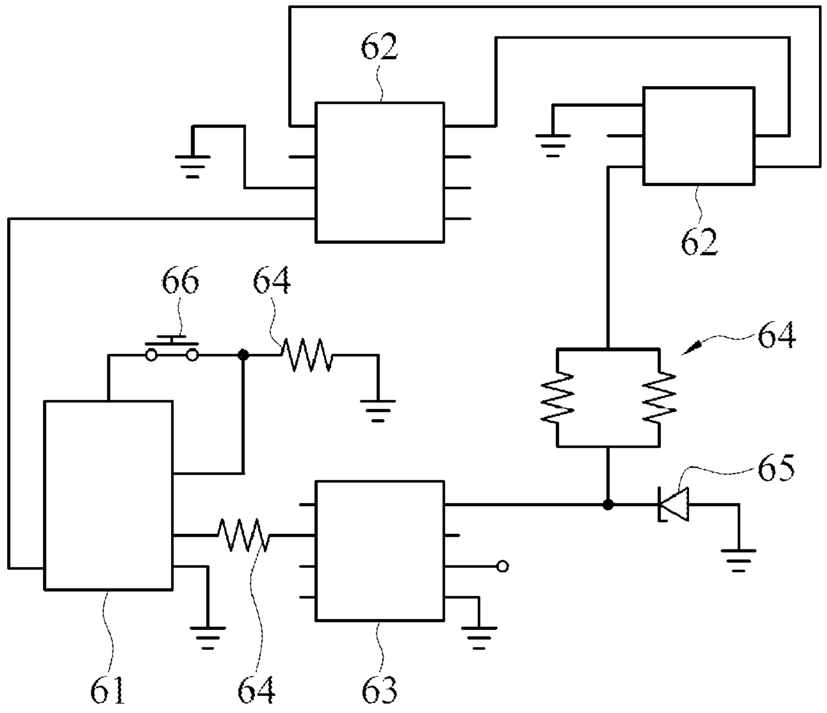
FIG. 2A is a circuit diagram of a pulse-valve controller according to an embodiment of the present invention.
Figure 2B:
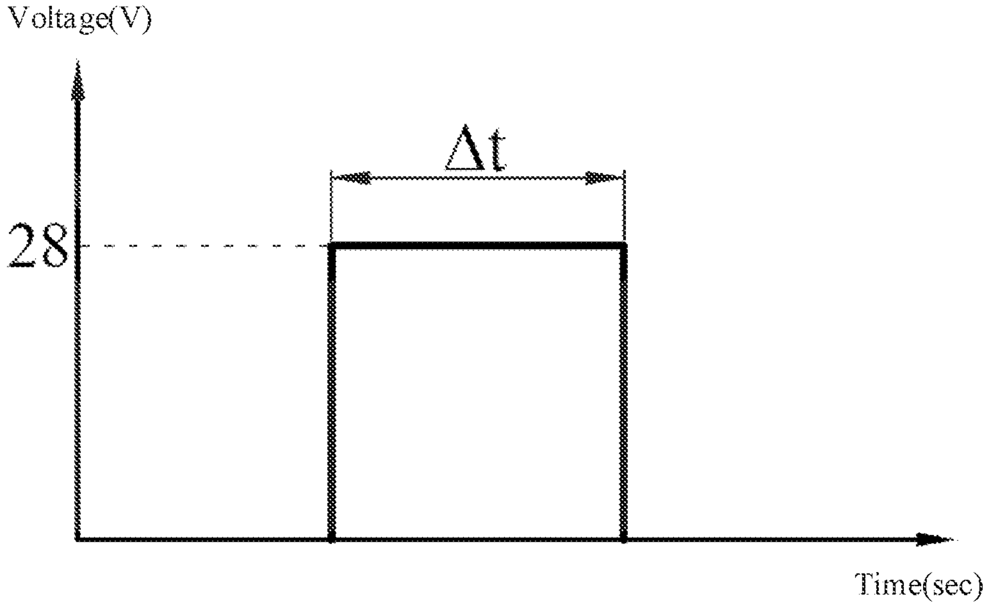
FIG. 2B is a diagram of a pulse signal generated by a pulse-valve controller according to an embodiment of the present invention.

Referring to FIG. 2A and FIG. 2B together, FIG. 2A is a circuit diagram of a pulse-valve controller 23 according to an embodiment of the present invention, and FIG. 2B is a diagram of a pulse signal generated by the pulse-valve controller 23 according to an embodiment of the present invention. The pulse-valve controller 23 is electrically connected to the pulse valve 22 and is configured to control the pulse valve 22, to enable the gas-puff generator 2 to supply a gas puff in a pulsed manner. FIG. 2A shows an embodiment of a circuit of the pulse-valve controller 23, and the circuit mainly includes a microcontroller 61, two DC-DC converters 62, a signal generator 63, several resistors 64, a zener diode 65, and a switch 66.

In some embodiments, the microcontroller 61 may include an Arduino nano kit, and the two DC-DC converters 62 supply a DC electric power of 5 V and a DC electric power of 30 V to the microcontroller 61 and the signal generator 63, respectively. However, since a driving voltage of the pulse valve 22 in this embodiment is 28 V, the driving voltage of 28 V obtained through combining five 5V zener diodes 65 and one 3V zener diode 65 is used for the signal generator 63. In addition, the switch 66 is mainly used to test this circuit design. It can be seen from FIG. 2B that the pulse-valve controller 23 can generate a 28V square wave, where $\Delta t$ is an opening time of the pulse valve 22 and can be adjusted according to actual needs.

Figure 3A:
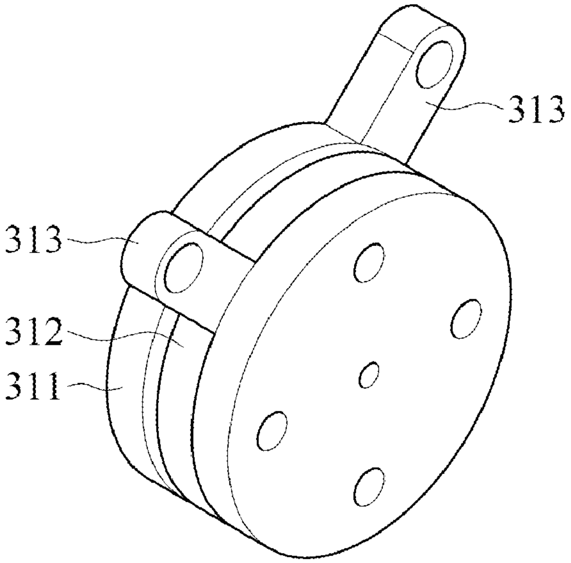
FIG. 3A is a three-dimensional diagram of an ionization convergent-divergent nozzle according to an embodiment of the present invention.
Figure 3B:
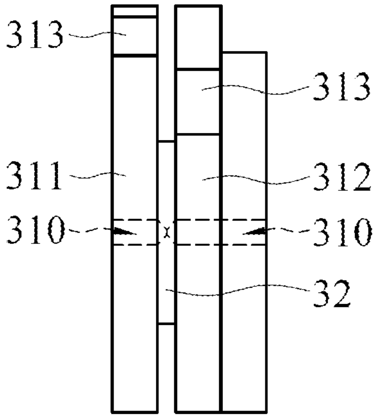
FIG. 3B is a cross-sectional diagram of an ionization convergent-divergent nozzle according to an embodiment of the present invention.
Figure 4:
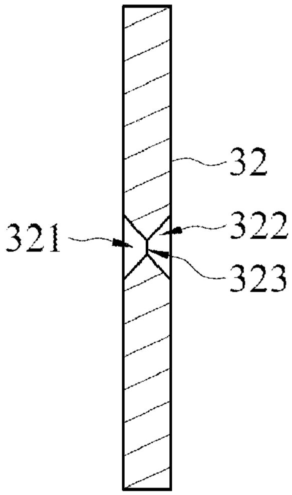
FIG. 4 is a cross-sectional diagram of an insulating nozzle according to an embodiment of the present invention.

Referring to FIG. 1, FIG. 3A, FIG. 3B, and FIG. 4 together, FIG. 3A is a three-dimensional diagram of the ionization convergent-divergent nozzle according to an embodiment of the present invention, FIG. 3B is a cross-sectional diagram of the ionization convergent-divergent nozzle according to the embodiment of the present invention, and FIG. 4 is a cross-sectional diagram of an insulating nozzle according to the embodiment of the present invention. In some embodiments, the ionization convergent-divergent nozzle 3 may include a pair of electrodes 31, an insulating nozzle 32, and a capacitor 33. The insulating nozzle 32 is sandwiched between the pair of electrodes 31. The capacitor 33 is connected in parallel to the pair of electrodes 31 and supplies a voltage across the pair of electrodes 31, which may be 1 kV.

Further, the pair of electrodes 31 include a first electrode disk 311 and a second electrode disk 312. The first electrode disk 311 and the second electrode disk 312 may be made of brass, may have a thickness of about 5 mm, may have a diameter of about 40 mm, and each have an electrical terminal 313 electrically connected to the capacitor 33. In addition, each of the first electrode disk 311 and the second electrode disk 312 has a through hole 310 with a diameter of about 2.5 mm.

In addition, the insulating nozzle 32 may be made of Teflon, and may have a thickness of about 2 mm. A convergent hole 321 and a divergent hole 322 are located at either side of the insulating nozzle 32, and a throat 323 is sandwiched between the convergent hole 321 and the divergent hole 322. The maximum diameter of the two holes can be about 2.5 mm, and the minimum diameter can be about 0.5 mm. An opening angle of the convergent hole 321 and the divergent hole 322 may be greater than or equal to 90 degrees. In addition, the through holes 310 of the first electrode disk 311 and the second electrode disk 312, the convergent hole 321, the throat 323, and the divergent hole 322 are connecting with each other.

FIG. 1 further shows a pair of accelerating coil sets 4 and 5, which are electrically connected to the pair of electrodes 31, that is, two ends of each of the accelerating coil sets 4 and 5 are connected in series to the first electrode disk 311 and the second electrode disk 312, respectively. In some embodiments, the accelerating coil sets 4 and 5 may be located on a side of the ionization convergent-divergent nozzle 3 and away from the gas-puff generator 2, that is, downstream along the gas puff. The accelerating coil set 4 is further arranged between the accelerating coil set 5 and the ionization convergent-divergent nozzle 3. A coil radius of the accelerating coil set 4 is smaller than a coil radius of the accelerating coil set 5, so a magnetic field generated by the accelerating coil set 4 is greater than that generated by the accelerating coil set 5. This configuration creates axially non-uniform magnetic fields to generate thrust and accelerate the plasma plume.

It's important to note that the magnetic field is only formed when the plasma plume is created, and the accelerating coil sets 4 and 5 are energized to generate the magnetic field simultaneously with the formation of the plasma plume. The plasma plume is generated only on a downstream side of the throat 323, and the plasma plume interacts with the magnetic fields generated by the accelerating coil sets 4 and 5 to produce thrust. Therefore, the key to generate effective electromagnetic thrust lies in the magnetic field that covers the throat 323 and the downstream side of the throat 323. In other words, as long as the magnetic field in the upstream of the flow direction of the entire plasma plume after the throat 323 is greater than the magnetic field in the downstream, thrust can be generated. In summary, having a magnetic field at the throat 323 greater than that at downstream of the throat 323 is essential for creating thrust.

In another embodiment, one or even both of the pair of accelerating coil sets 4 and 5 can alternatively be arranged within the ionization convergent-divergent nozzle 3, for example, arranged on the insulating nozzle 32 and located on a side of the throat 323, that is, the side away from the convergent hole 321, that is, around the divergent hole 322 or around the second electrode disk 312. In addition, there may be one or more coils in the coil set mentioned in this embodiment. In an embodiment in which a coil set includes many coils, the coil set may has many turns of coils wound continuously and presented in single or multiple layers or stacked manner, or many separated coils connected in series and presented in a side-by-side manner or the smaller one located inside the bigger one.

A controlled of arrangement positions of the pair of accelerating coil sets 4 and 5 is the time difference between the time when the electric arc discharge in the ionization convergent-divergent nozzle 3 that generates the plasma plume and the time when the magnetic fields in the accelerating coil sets 4 and 5 that generate the thrust. This depends on the overall scale and specifications of the entire thruster. If the time difference is very short, the accelerating coil sets 4 and 5 need to be placed closer to the throat 323 of the insulating nozzle 32, so that the electrothermal thrust and the electromagnetic thrust can be triggered sequentially in a very short period of time. Conversely, the accelerating coil sets 4 and 5 can be arranged further downstream away from the insulating nozzle 32, which can extend the entire thrust generation time.

It should be further noted that the dimensions mentioned above are only specifications for experiments and tests. The present invention should not be limited to these dimensions. In an actual implementation, these dimensions can be scaled up or down according to the scale requirement of an actual propulsion system. In addition, other embodiments are not limited to a pair of accelerating coil sets 4 and 5, and may alternatively be a single accelerating coil set or many accelerating coil sets 4 and 5. In an embodiment of a single accelerating coil set, the single magnetic field can generate a thrust to accelerate the plasma plume. Therefore, as long as the magnetic field at the throat 323 is greater than that on the downstream side of the throat 323, whether a single magnetic field or multiple magnetic fields are presented therein, the so-called unbalanced theta-pinch effect can be generated. This effect facilitates rear-end acceleration for the plasma puff.

The following describes an operating principle of an embodiment of the present invention. Refer to FIG. 1 together. When the thruster starts to operate, first the gas-puff generator 2 controls the pulse valve 22 to open through the pulse-valve controller 23 to generate a gas puff, and the gas puff enters the ionization convergent-divergent nozzle 3 and initiates a first stage of acceleration.

Then, as the gas puff passes through the pair of electrodes 31, the gas puff serves as an electrical conductive medium when it is ionized becoming plasma. As the gas pressure drops rapidly while the gas puff passes through the ionization convergent-divergent nozzle 3, and with a high voltage difference between the pair of electrodes 31, such as 1 kV, the gas puff experiences an electrical breakdown, resulting in a sudden decrease in resistance, i.e. a high-voltage breakdown phenomenon. In this scenario, the electric arc discharge is triggered between the pair of electrodes 31. Therefore, the first electrode disk 311 and the second electrode disk 312 become electrically conductive with each other. In other words, the gas puff is ionized, forming a plasma plume. Due to an increase of the plasma plume temperature, the plasma plume is accelerated again and undergoes a second stage of acceleration.

In addition, since the accelerating coil sets 4 and 5 are electrically connected to the pair of electrodes 31 of the ionization convergent-divergent nozzle 3, when the electric arc discharge between the first electrode disk 311 and the second electrode disk 312 is triggered by the gas puff, the current simultaneously passes through the accelerating coil sets 4 and 5 to generate respective magnetic fields. In this case, since the accelerating coil sets 4 and 5 generate axially non-uniform magnetic fields, especially the magnetic field generated by the accelerating coil set 4 is greater than the magnetic field generated by the accelerating coil set 5. This arrangement results in the magnetic field at the throat 323 is greater than the magnetic field at the downstream side of the throat 323. The magnetic fields provide a thrust on the plasma plume, leading to the third stage of acceleration of the plasma plume.

The following table presents relevant theoretical data such as theoretical thrust, specific impulse, gas outlet velocity, and current for some embodiments of the present invention. The diameter of the accelerating coil set 4 is set to 1 mm, and the diameter of the accelerating coil set 5 is set to 2.5 mm. The distance between the two diameters is 10 mm, and the gas pressure is approximately 10-3 torr. It can be seen from the table that when a discharging current of the capacitor 33 to the pair of electrodes 31 is 10 A, a thrust of 4 mN can be generated; when the discharging current is 100 A, a thrust of 40 mN can be generated; and when a discharging current is 1000 A, a thrust of 4000 mN can be generated.

| Current I (A) | Outlet velocity $v_{ex}$ (m/s) | Specific impulse Isp (sec) | Impulse $\Delta mv_{ex}$ (kg-m/s) | Thrust F(mN) |
|---|---|---|---|---|
| 1000 | 62760 | 6404 | $4 \times 10^{-7}$ | 4000 |
| 100 | 6276 | 640 | $4 \times 10^{-8}$ | 40 |
| 10 | 627.6 | 64 | $4 \times 10^{-9}$ | 4 |

It can be seen from above that in some embodiments, only the pulse valve 22 needs to be controlled to provide a gas puff, and the capacitor 33 may be powered, for example, by an external power supply. When the gas puff passes through the pair of electrodes 31 of the ionization convergent-divergent nozzle 3, the electrothermal thrust force and the electromagnetic thrust force are automatically triggered and generated, and respectively form thrust for the second stage of acceleration and the third stage of acceleration, without the need for additional trigger controllers or circuits. This approach offers advantages in terms of simplicity, reliability, and cost-effectiveness.

Furthermore, in some embodiments, the use of arc discharge for ionizing the gas results in a higher ionization rate, which leads to greater efficiency and reduces electrode wear, thereby extending the operational lifespan. Additionally, in some embodiments, the operation is pulse-based, which means the average power is lower, making it suitable for application in small satellites.

In addition, in some embodiments, the pair of electrodes 31 and the accelerating coil sets 4 and 5 are connected in series with each other, so the electric power of a single power supply system can be simultaneously supplied to the ionization convergent-divergent nozzle 3 and the accelerating coil sets 4 and 5. That is to say, the current used in the electric arc discharging process not only forms and heats the plasma plume but also energizes the accelerating coil sets 4 and 5 to generate magnetic fields. This multi-use of energy results in high energy efficiency. Furthermore, since gas is used as the propellant, there's no need to expend energy on vaporizing solid propellants, further reducing energy consumption.

In addition, in some embodiments, multiple thrust modes can be provided. For example, in a cold-gas propulsion mode with a low thrust effect (gas propulsion portion Tg1), the thrust can be generated simply by a cold-gas thrust force generated when the gas puff passes through the ionization convergent-divergent nozzle 3 without activation the power supply. In another aspect, in a high thrust mode of other embodiments, the operation can be carried out, as described above. The gas propulsion portion Tg1 generates a cold-gas thrust, plus an electrothermal thrust of a plasma generated by an electrothermal propulsion portion Tg2, and an electromagnetic thrust of magnetic fields generated by an electromagnetic propulsion portion Tg3. These three stages of thrust add up to achieve high propulsion efficiency.

Figure 5:
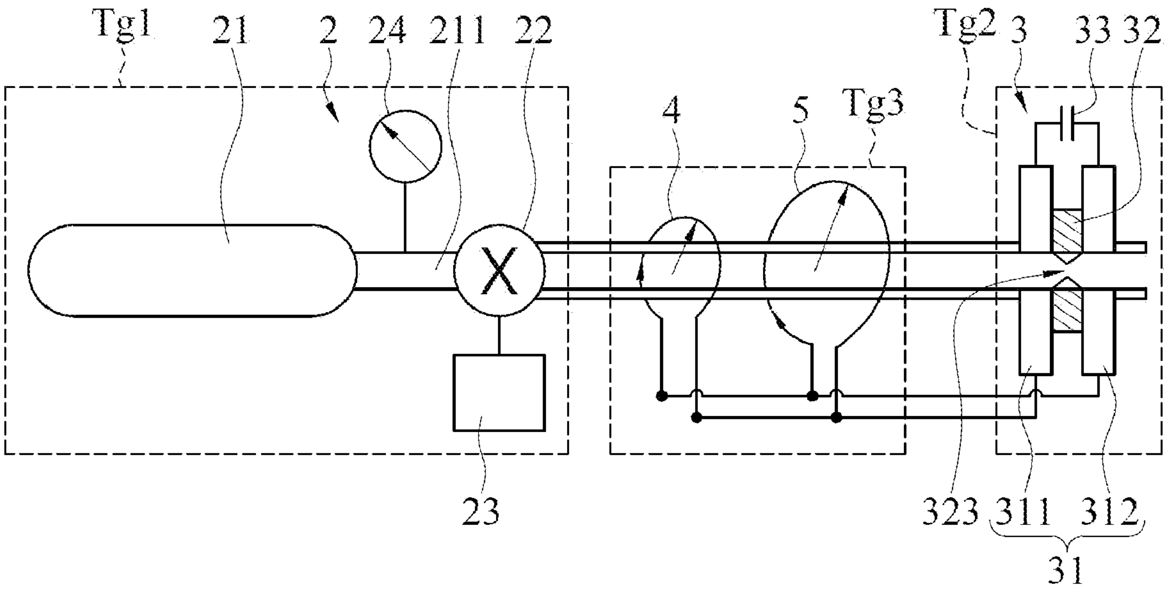
FIG. 5 is a schematic diagram according to another embodiment of the present invention.

Refer to FIG. 5, which is a schematic diagram according to another embodiment of the present invention. A main difference between this embodiment and the foregoing embodiment is that the accelerating coil sets 4 and 5 of this embodiment are arranged between the gas-puff generator 2 and the ionization convergent-divergent nozzle 3. Similarly, the magnetic field generated by the accelerating coil set 4 located at the upstream side of the gas puff is greater than the magnetic field generated by the accelerating coil set 4 located at the downstream side. However, the magnitude of the magnetic field can similarly be controlled through the coil radius. That is to say, the coil radius of the accelerating coil set 4 is smaller than the coil radius of the accelerating coil set 5. Accordingly, in this embodiment, the gas puff can be accelerated by the accelerating coil sets 4 and 5 before entering the ionization convergent-divergent nozzle 3. In addition, in other embodiments, the accelerating coil sets 4 and 5 can alternatively be arranged on both sides of the ionization convergent-divergent nozzle 3, respectively. The key point of the arrangement is that the magnetic field that closer to the upstream side (of either the gas puff or the plasma plume) should be greater than that on the downstream side, to enable the magnetic field at the throat 323 to be greater than the magnetic field on the downstream side of the throat 323. Only in this way, thrust can be formed.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A pulsed-plasma thruster using an unbalanced theta-pinch, comprising:

a gas-puff generator, comprising a gas outlet;

an ionization convergent-divergent nozzle, comprising a pair of electrodes, an insulating nozzle, and a capacitor, wherein the insulating nozzle is arranged between the pair of electrodes, the insulating nozzle comprises a convergent hole, a throat, and a divergent hole, the convergent hole and the divergent hole are separately arranged on two opposing surfaces of the insulating nozzle and are connected with each other through the throat, and the convergent hole is attached to the gas outlet of the gas-puff generator; and the capacitor is connected in parallel to the pair of electrodes and supplies a voltage across the pair of electrodes; and an accelerating coil set, arranged on one side of the throat of the ionization convergent-divergent nozzle, the accelerating coil set being electrically connected to the pair of electrodes, wherein in response to supplying a gas puff to the ionization convergent-divergent nozzle by the gas-puff generator, the pair of electrodes of the ionization convergent-divergent nozzle generate an electric arc to ionize the gas puff to form a plasma plume, and the pair of electrodes further conduct the accelerating coil set to accelerate the plasma plume.

2. The pulsed-plasma thruster using an unbalanced theta-pinch according to claim 1, wherein the gas-puff generator comprises a high-pressure-gas reservoir, a pulse valve, and a pulse-valve controller, the pulse valve is attached to the gas outlet of the high-pressure-gas reservoir, and the pulse-valve controller is electrically connected to the pulse valve and is configured to control the pulse valve to supply the gas puff in a pulsed manner from the gas-puff generator.

3. The pulsed-plasma thruster using an unbalanced theta-pinch according to claim 1, wherein the pair of electrodes comprise a first electrode disk and a second electrode disk, the first electrode disk and the second electrode disk each comprise a through hole; and the through holes of the first electrode disk and the second electrode disk are connected with the convergent hole, the throat, and the divergent hole of the insulating nozzle.

4. The pulsed-plasma thruster using an unbalanced theta-pinch according to claim 1, wherein the accelerating coil set is arranged between the ionization convergent-divergent nozzle and the gas-puff generator.

5. The pulsed-plasma thruster using an unbalanced theta-pinch according to claim 1, further comprising another accelerating coil set, wherein the another accelerating coil set is arranged on one side of the accelerating coil set and is away from the ionization convergent-divergent nozzle; wherein a coil radius of the accelerating coil set is less than a coil radius of the another accelerating coil set, to enable a magnetic field at the throat to be greater than a magnetic field on a downstream side of the throat.

6. The pulsed-plasma thruster using an unbalanced theta-pinch according to claim 5, wherein a central axis of the accelerating coil set and the another accelerating coil set extends through the convergent hole, the throat, the divergent hole of the insulating nozzle, and the gas outlet of the gas-puff generator.

7. A pulsed-plasma thruster using an unbalanced theta-pinch, comprising:

a gas-puff generator, comprising a gas outlet, wherein the gas-puff generator is configured to supply a gas puff in a pulsed manner through the gas outlet;

an ionization convergent-divergent nozzle, comprising a pair of electrodes, an insulating nozzle, and a capacitor, wherein the insulating nozzle is sandwiched between the pair of electrodes, the insulating nozzle comprises a convergent hole, a throat, and a divergent hole, the convergent hole and the divergent hole are separately arranged on two opposing surfaces of the insulating nozzle and are connected with each other through the throat; the convergent hole is attached to the gas outlet of the gas-puff generator; and the capacitor is connected across the pair of electrodes and supplies a voltage across the pair of electrodes; and a pair of accelerating coil sets, arranged on a side of the throat of the ionization convergent-divergent nozzle, and electrically connected to the pair of electrodes, wherein when the gas puff enters the ionization convergent-divergent nozzle, an electric arc is generated between the pair of electrodes of the ionization convergent-divergent nozzle so that the gas puff is ionized and forms a plasma plume, and the current through the pair of electrodes further drives the pair of accelerating coil sets to generate the respective axially non-uniform magnetic fields; wherein a magnetic field generated by one of the pair of accelerating coil sets that is located on an upstream side of the gas puff or the plasma plume is greater than a magnetic field generated by one that is located on a downstream side of the gas puff or the plasma plume.

8. The pulsed-plasma thruster using an unbalanced theta-pinch according to claim 7, wherein a magnetic field at the throat is greater than a magnetic field on a downstream side of the throat.

9. The pulsed-plasma thruster using an unbalanced theta-pinch according to claim 7, wherein a central axis of the pair of accelerating coil sets extends through the convergent hole, the throat, the divergent hole of the insulating nozzle, and the gas outlet of the gas-puff generator.

10. The pulsed-plasma thruster using an unbalanced theta-pinch according to claim 7, wherein the pair of electrodes comprise a first electrode disk and a second electrode disk; the first electrode disk and the second electrode disk each comprise a through hole; and the through holes of the first electrode disk and the second electrode disk are connected with the convergent hole, the throat, and the divergent hole of the insulating nozzle.

* * * * *